United States Patent
Schwarte et al.

(10) Patent No.: US 9,086,028 B2
(45) Date of Patent: Jul. 21, 2015

(54) METHOD AND DEVICE FOR OPERATING AN INJECTION VALVE

(75) Inventors: Anselm Schwarte, Bad Abbach (DE); Peter Matthias Ruße, Tegernheim (DE); Nicolas Nozeran, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 419 days.

(21) Appl. No.: 13/702,095

(22) PCT Filed: Jun. 7, 2011

(86) PCT No.: PCT/EP2011/002787
§ 371 (c)(1),
(2), (4) Date: Feb. 13, 2013

(87) PCT Pub. No.: WO2011/154124
PCT Pub. Date: Dec. 15, 2011

(65) Prior Publication Data
US 2013/0166179 A1 Jun. 27, 2013

(30) Foreign Application Priority Data
Jun. 7, 2010 (DE) .......................... 10 2010 022 910

(51) Int. Cl.
*F02D 41/20* (2006.01)
*F02M 63/00* (2006.01)
(Continued)

(52) U.S. Cl.
CPC ............ *F02D 41/20* (2013.01); *F02D 41/2096* (2013.01); *F02D 41/38* (2013.01);
(Continued)

(58) Field of Classification Search
CPC ..... F02D 41/2096; F02D 41/20; F02D 41/38; F02D 41/40; F02D 41/402; F02D 41/403; F02D 41/405; F02M 51/0603; F02M 63/0026

USPC ......... 701/101, 102, 103, 104, 105; 123/498, 123/472, 478, 490, 499, 299, 300, 304; 239/102.2
See application file for complete search history.

(56) References Cited

U.S. PATENT DOCUMENTS 7,690,358 B2    4/2010   Lederle et al. ................. 123/498
7,917,281 B2 *  3/2011   Yamada et al. ................ 701/104
(Continued)

FOREIGN PATENT DOCUMENTS

DE    102005030132 A1    1/2007   ............. F02M 47/00
DE    102005046743 B3    5/2007   ............. F02M 65/00
(Continued)

OTHER PUBLICATIONS

German Office Action, Application No. 10 2010 022 910.5-26, 3 pages, Dec. 20, 2010.
(Continued)

*Primary Examiner* — Mahmoud Gimie
(74) *Attorney, Agent, or Firm* — Slayden Grubert Beard PLLC

(57) ABSTRACT

An injection nozzle has a nozzle needle that suppresses metering of fluid in a closed position and otherwise allows the metering of fluid. Furthermore, the injection valve has a solid-state actuator that acts on the nozzle needle. A first operating phase is performed for a closing operation in a first operating mode, during which first operating phase the solid-state actuator is discharged to a predefined part charge. Furthermore, a second operating phase is performed, during which the solid-state actuator is operated as a sensor. An operating duration of the second operating phase is predefined such that the closed position of the nozzle needle is reached during the operating duration. A third operating phase is performed, during which the solid-state actuator is discharged further to a predefined reference state. In a second operating mode, the first and second operating phases are carried out and the third operating phase is omitted.

11 Claims, 6 Drawing Sheets

(51) Int. Cl.
  *F02M 51/06* (2006.01)
  *F02D 41/38* (2006.01)
  *F02D 41/40* (2006.01)

(52) U.S. Cl.
  CPC .......... *F02D41/3809* (2013.01); *F02D 41/402* (2013.01); *F02D 41/403* (2013.01); *F02D 41/405* (2013.01); *F02M 51/0603* (2013.01); *F02M 63/0026* (2013.01); *Y02T 10/44* (2013.01)

(56) References Cited

U.S. PATENT DOCUMENTS

| | | | |
|---|---|---|---|
| 8,365,704 B2 | 2/2013 | Beilharz et al. | 123/480 |
| 2003/0089332 A1 | 5/2003 | Yomogida | 123/299 |
| 2009/0150044 A1 | 6/2009 | Topinka et al. | 701/103 |
| 2010/0288238 A1* | 11/2010 | Beilharz et al. | 123/480 |

FOREIGN PATENT DOCUMENTS

| | | | | |
|---|---|---|---|---|
| DE | 102007033469 A1 | 1/2009 | | F02D 41/20 |
| DE | 102004027291 B4 | 11/2009 | | F02D 41/20 |
| EP | 0570968 A2 | 11/1993 | | G03B 7/28 |
| WO | 2011/154124 A1 | 12/2011 | | F02D 41/20 |

OTHER PUBLICATIONS

International Search Report and Written Opinion, Application No. PCT/EP2011/002787, 14 pages, Sep. 13, 2011.

\* cited by examiner

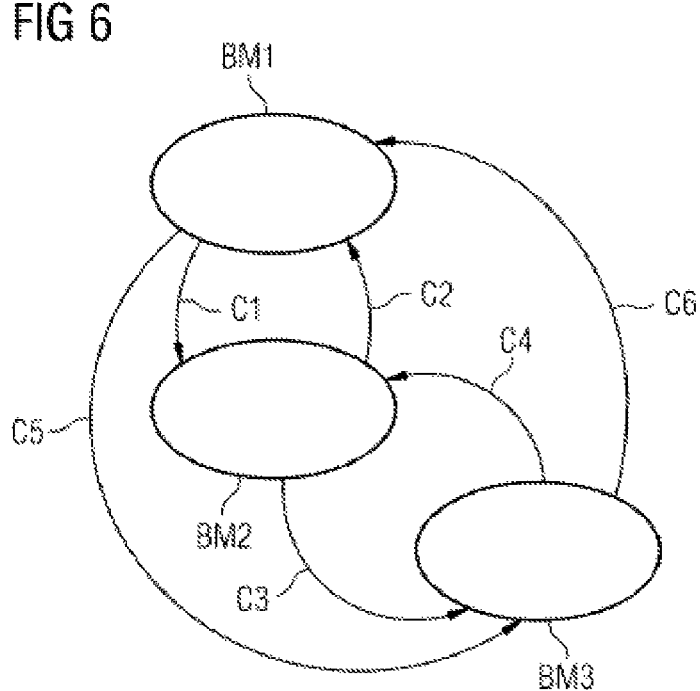

METHOD AND DEVICE FOR OPERATING AN INJECTION VALVE

CROSS-REFERENCE TO RELATED APPLICATIONS

This application is a U.S. National Stage Application of International Application No. PCT/EP2011/002787 filed Jun. 7, 2011, which designates the United States of America, and claims priority to DE Application No. 10 2010 022 910.5 filed Jun. 7, 2010, the contents of which are hereby incorporated by reference in their entirety.

TECHNICAL FIELD

The disclosure relates to a method and a device for operating an injection valve, which is used in particular for metering fluid, in particular fuel.

BACKGROUND

Ever more stringent legal regulations with regard to the admissible pollutant emissions of internal combustion engines which are arranged in motor vehicles make it necessary to implement various measures by which the pollutant emissions can be lowered. One approach here is to lower the pollutant emissions generated during the combustion process of the air/fuel mixture. In this connection, extremely precise metering of fuel may be advantageous.

Furthermore, it may also be advantageous in this connection for multiple injections to take place during a working cycle at least in certain operating states.

SUMMARY

In one embodiment, a method is provided for operating an injection valve having a nozzle needle which prevents a metering of fluid when in a closed position and otherwise permits the metering of fluid, a solid-state actuator which is designed to act on the nozzle needle and influence the position thereof, wherein, for a closing process of the nozzle needle, in a first operating mode, a first operating phase is carried out during which the solid-state actuator is discharged to a predefined partial charge, a second operating phase is carried out during which the solid-state actuator is operated as a sensor, the operating duration of which second operating phase is predefined such that the nozzle needle reaches the closed position during the operating duration, a third operating phase is carried out during which the solid-state actuator is discharged further to a predefined reference state, wherein, for the closing process, in a second operating mode, the first operating phase is carried out, the second operating phase is carried out and the third operating phase is omitted.

In a further embodiment, for the closing process, in a third operating mode, the first operating phase is carried out, the second operating phase is omitted and the third operating phase is omitted.

In a further embodiment, changes between the individual operating modes are carried out as a function of a desired metering interval between successive fluid metering events.

In a further embodiment, a residual charge quantity at the end of the closing process is estimated by means of a charge monitoring means.

In a further embodiment, a charging time duration of the solid-state actuator in a subsequent opening process is adapted as a function of the estimated residual charge quantity and/or a determined residual voltage.

In a further embodiment, a regulation of the electrical energy to be supplied to the solid-state actuator is adapted as a function of the estimated residual charge quantity and/or a determined residual voltage.

In a further embodiment, the adaptation of the regulation of the electrical energy to be supplied to the solid-state actuator is carried out by adaptation of a profile of a current setpoint value for the solid-state actuator.

In a further embodiment, an activation duration extending from a start of the charging to a start of the discharging of the solid-state actuator is adapted as a function of the estimated residual charge quantity and/or a determined residual voltage.

In a further embodiment, a start of activation which represents the start of the charging of the solid-state actuator is adapted as a function of the estimated residual charge quantity and/or a determined residual voltage.

In a further embodiment, a needle flight time and/or a needle opening duration are/is adapted as a function of the estimated residual charge quantity and/or a determined residual voltage.

In another embodiment, a device is provided for operating an injection valve having a nozzle needle which prevents a metering of fluid when in a closed position and otherwise permits the metering of fluid, a solid-state actuator which is designed to act on the nozzle needle and influence the position thereof, wherein the device is designed, for a closing process of the nozzle needle, in a first operating mode, to carry out a first operating phase during which the solid-state actuator is discharged to a predefined partial charge, to carry out a second operating phase during which the solid-state actuator is operated as a sensor, the operating duration of which second operating phase is predefined such that the nozzle needle reaches the closed position during the operating duration, and to carry out a third operating phase during which the solid-state actuator is discharged further to a predefined reference state, and the device is furthermore designed, for the closing process, in a second operating mode, to carry out the first operating phase, to carry out the second operating phase and to omit the third operating phase.

BRIEF DESCRIPTION OF THE DRAWINGS

Exemplary embodiments will be explained in more detail below on the basis of the schematic drawings, wherein:

FIG. 6 shows a state transition diagram of a state machine illustration.

DETAILED DESCRIPTION

Figure 1:
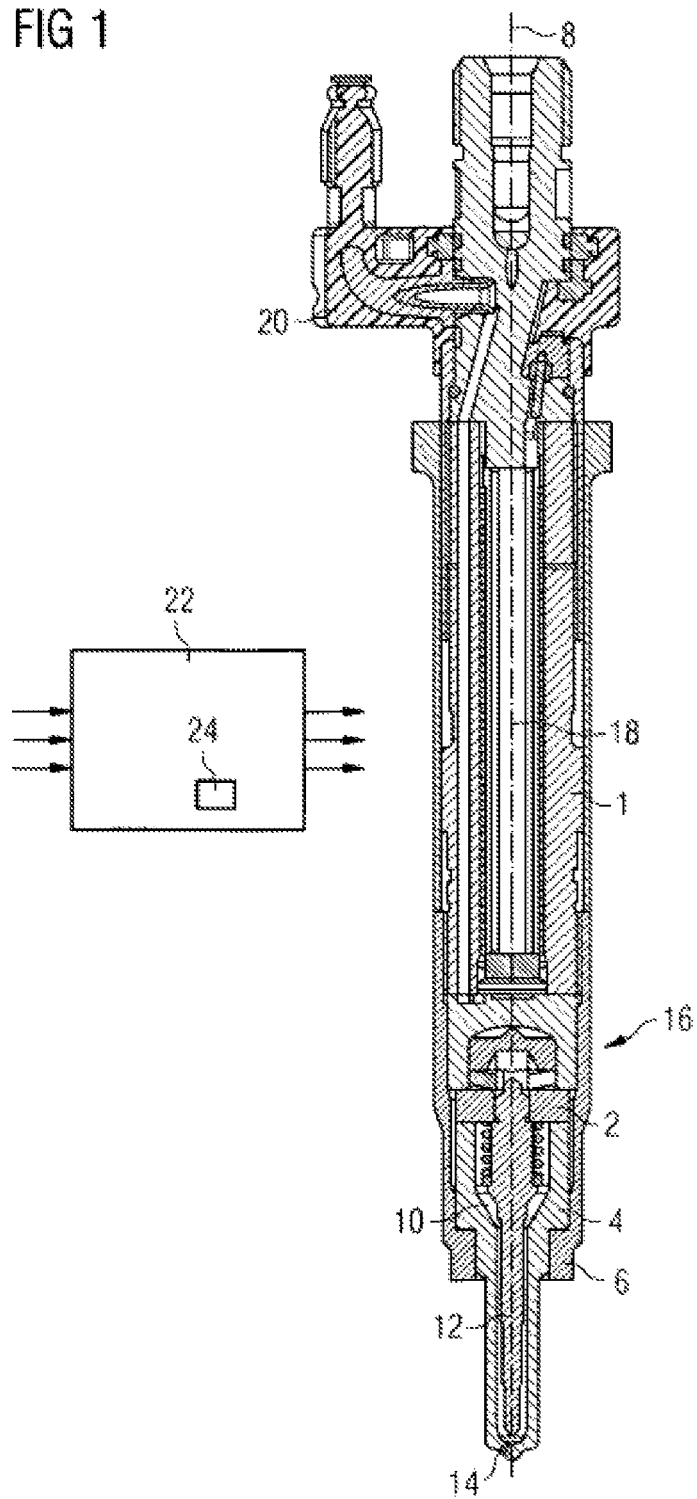
FIG. 1 shows an injection valve having a control device.

Embodiments of the present disclosure provide a method and a device for operating an injection valve, which method and device permit a precise metering of fluid through the injection valve.

For example, some embodiments provide a method and a device for operating an injection valve, having a nozzle needle which prevents a metering of fluid in a closed position and otherwise permits the metering of fluid. Furthermore, the injection valve has a solid-state actuator which is designed to act on the nozzle needle and influence the position thereof. For a closing process of the nozzle needle, in a first operating mode, first to third operating phases are carried out. During the first operating phase, the solid-state actuator is discharged to a predefined partial charge. During the second operating phase, the solid-state actuator is operated as a sensor, specifically to detect the time at which the closed position of the nozzle needle is reached, wherein for this purpose in particular a signal of the solid-state actuator is suitably evaluated. The operating duration of the second operating phase is predefined such that the nozzle needle reaches the closed position during the operating duration. A third operating phase is carried out during which the solid-state actuator is discharged to a predefined reference state, in particular a predefined reference charge.

For the closing process of the nozzle needle, in a second operating mode, the first and the second operating phase are carried out, whereas the third operating phase is omitted.

In this way, in the first operating mode, an extremely precise metering of the fluid can take place, and on the other hand, in the second operating mode, a very short metering interval between two successive fluid metering events can be realized. Such a short metering interval may be advantageous, in particular in the case of multiple injections of fluid in rapid succession, for example within one working cycle of an internal combustion engine, with regard to a reduction of the pollutant emissions generated by the combustion engine, and can also offer the possibility of favorably influencing a cylinder pressure profile and keeping combustion noise low.

In one embodiment, for the closing process, in a third operating state, the first operating phase is carried out, whereas the second and third operating phases are omitted. In this way, it is then possible in the third operating mode to attain a yet further reduced metering interval between two successive fluid metering events.

In one embodiment, changes between the individual operating modes are carried out as a function of a desired metering interval between successive fluid metering events. In this way, the individual operating modes can be implemented in a particularly targeted manner, and therefore as expedient as possible a metering, in particular a precise metering, of fluid can take place in accordance with the desired metering interval. Furthermore, the change between the individual operating modes may also be dependent on a further operating variable.

In a further embodiment, a residual charge quantity at the end of the closing process is estimated by means of a charge monitoring means.

In a further embodiment, a charging time duration of the solid-state actuator in a subsequent opening process is adapted as a function of the estimated residual charge quantity, which may also be a measured residual charge quantity. The charging time duration of the solid-state actuator may alternatively or additionally be adapted in a subsequent opening process as a function of a determined residual voltage.

In this way, a particularly precise metering of fluid can take place in particular also in the second and/or third operating mode.

In a further embodiment, a regulation of the electrical energy to be supplied to the solid-state actuator is adapted as a function of the estimated residual charge quantity and/or the determined residual voltage. In this way, too, it is particularly expediently possible to also realize a particularly precise metering of fluid in particular in the second and/or the third operating mode.

In a further embodiment, the adaptation of the regulation of the electrical energy to be supplied to the solid-state actuator is carried out by adaptation of a profile of a setpoint current value for the solid-state actuator. This, too, can expediently contribute to a very precise metering of fluid being carried out in particular also in the second and/or the third operating mode.

In a further embodiment, an activation duration extending from a start of the charging to a start of the discharging of the solid-state actuator is adapted as a function of the estimated residual charge quantity.

In a further embodiment, a start of activation which represents the start of the charging of the solid-state actuator is adapted as a function of the estimated residual charge quantity.

In a further embodiment, a needle closing time duration and/or a needle opening time duration are/is adapted as a function of the estimated residual charge quantity and/or the determined residual voltage.

An injection valve has an injector housing 1 (FIG. 1) to which are also assigned an adapter plate 2, a nozzle body 4 and a nozzle clamping nut 6. The nozzle clamping nut couples the adapter plate 2 and the nozzle body 4 to the injector housing 1. The adapter plate 2 and/or the nozzle body 4 may basically also be formed in one piece with the injector housing 1.

The injector housing 1 furthermore has a fluid inlet 8 which is hydraulically coupled to a fluid supply which comprises for example a fluid high-pressure accumulator.

In a recess 10 of the nozzle body 4 there is arranged a nozzle needle 12. In the nozzle body 4 there is also formed at least one injection hole 14 which extends out of the nozzle body 4 to the outside from the recess 10.

Furthermore, the injection valve comprises a transmission arrangement 16 which comprises a lever and/or a stroke reversal means and by means of which the nozzle needle 12 can be mechanically coupled to a solid-state actuator 18.

The solid-state actuator 18 is formed for example as a piezoelectric actuator. Said solid-state actuator may however also be formed as any other solid-state actuator known to the appropriate person skilled in the art for such purposes, such as for example a magnetostrictive actuator.

Also provided is an electrical terminal 20 by means of which the injection valve can be coupled in electrically conductive fashion to a control device 22.

The control device 22 is designed to generate, as a function of at least one operating variable, at least one actuating signal which is provided for example for activating the injection valve. In this connection, operating variables comprise any desired measurement variables or also variables derived therefrom. The control device 22 also comprises a charge monitoring means 24 which is designed to estimate a residual charge quantity at the end of a closing process of the nozzle needle to the closed position thereof.

When the nozzle needle 12 is in a closed position, it prevents a metering of fluid through the at least one injection hole.

When the nozzle needle 12 is outside the closed position, that is to say when the nozzle needle is situated in a position offset, in the plane of the drawing, upward in the axial direction along the longitudinal axis of the injection valve in relation to its closed position, it permits the metering of fluid. To carry out a fluid metering event, electrical energy is firstly supplied to the solid-state actuator 18, specifically through the supply of a predefined charge.

This has the result that the solid-state actuator 18 expands in the axial direction, and said expansion is transmitted via the transmission arrangement 16 to the nozzle needle 12. In this way, a force is thus exerted on the nozzle needle 12, which force acts on the nozzle needle such that the nozzle needle 12 moves out of its closed position if no further forces act thereon. The nozzle needle is also acted on in particular by a spring force of a restoring spring, and also by hydraulic forces generated by the fluid pressure of the fluid in the recess 10. A movement of the nozzle needle 12 out of its closed position thus then takes place depending on the balance of the forces acting thereon. However, for the outward movement of the nozzle needle, the inertial force thereof must also be overcome, thus resulting in a so-called electrohydraulic delay time duration T_EH until the nozzle needle 12 actually moves out of its closed position.

For a closing process of the nozzle needle 12, during which said nozzle needle moves from a position outside the closed position back into its closed position, the injection valve can be operated in various modes.

Figure 2:
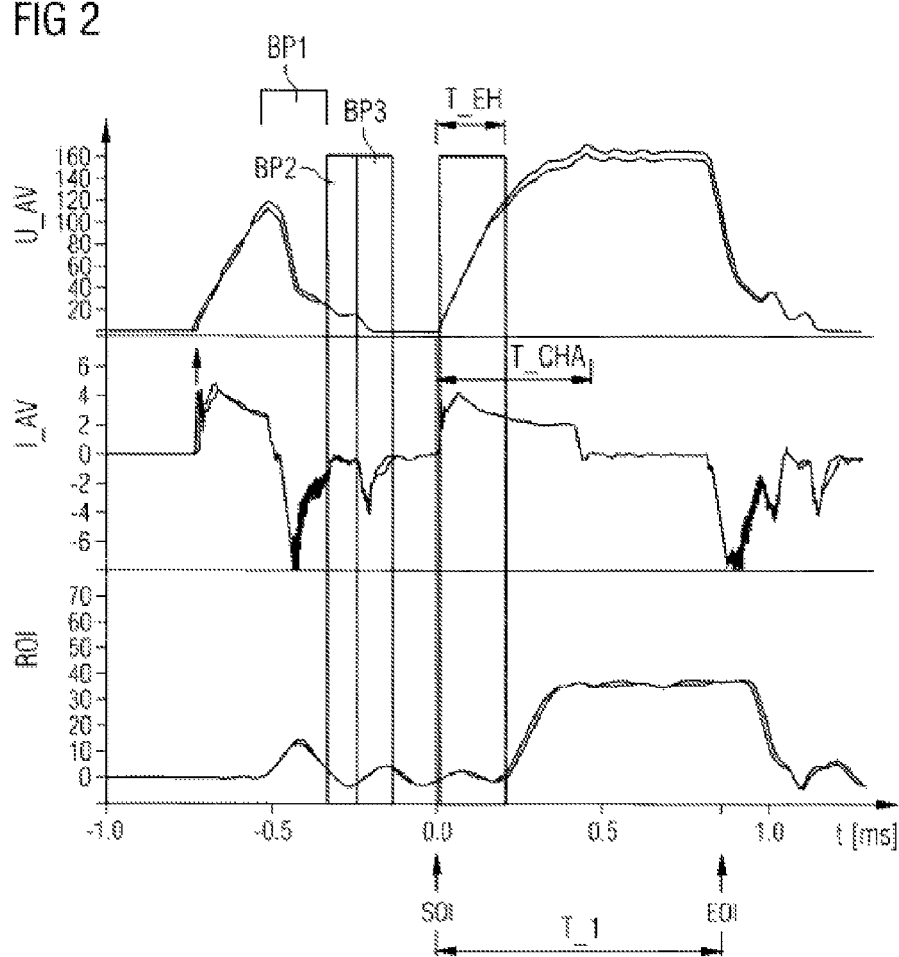
FIG. 2 shows signal profiles during the operation of the injection valve in a first operating mode.

A first operating mode BM1 is explained in more detail on the basis of FIG. 2. In a first operating phase BP1 of the first operating mode, the solid-state actuator is discharged to a partial charge. FIG. 2 illustrates three signal profiles, specifically profiles of a detected voltage drop U_AV across the solid-state actuator 18, a detected current I_AV fed to the solid-state actuator 18, and a detected fluid metering rate ROI of fluid metered by means of the injection valve. The profiles of the detected voltage U_AV, of the detected current I_AV and of the fluid metering rate ROI are plotted against the time t.

In a second operating phase BP2, the solid-state actuator 18 is operated as a sensor. The operating duration of the second operating phase BP2 is predefined such that the nozzle needle 12 reaches the closed position during the operating duration.

A third operating phase BP3 is carried out, during which the solid-state actuator 18 is discharged further to a predefined reference state, in particular to a predefined reference charge. The predefined reference charge corresponds for example to a fully discharged solid-state actuator, and results in a voltage drop across the solid-state actuator of for example 0 V. The partial charge is for example predefined such that there is a voltage drop of 18 to 20 V across the solid-state actuator.

Also illustrated in FIG. 2 is the electrohydraulic delay time duration T_EH.

Also illustrated in FIG. 2 is a charging time duration T_CHA. A start of activation SOI and an end of activation EOI are additionally illustrated. An activation duration is denoted by T_I. An actual metering rate has a value of 0 from the time at which the closed position is reached to the end of the electrohydraulic delay time duration T_EH.

A needle opening time duration extends from the start of activation SOI to the detection of the time at which a predefined open position of the nozzle needle 12 is reached. A needle closing time duration extends from the end of activation EOI to the detection of the time at which a closed position of the nozzle needle 12 is reached.

The operating phase 2 is for example predefined to last approximately 80 μs, and the operating phase 3 is for example provided to last approximately 100 μs. The electrohydraulic delay time period T_EH lasts for example approximately 150 μs. This has the result that, in the first operating mode BM1, a minimum attainable metering interval is approximately 330 μs.

Figure 3:
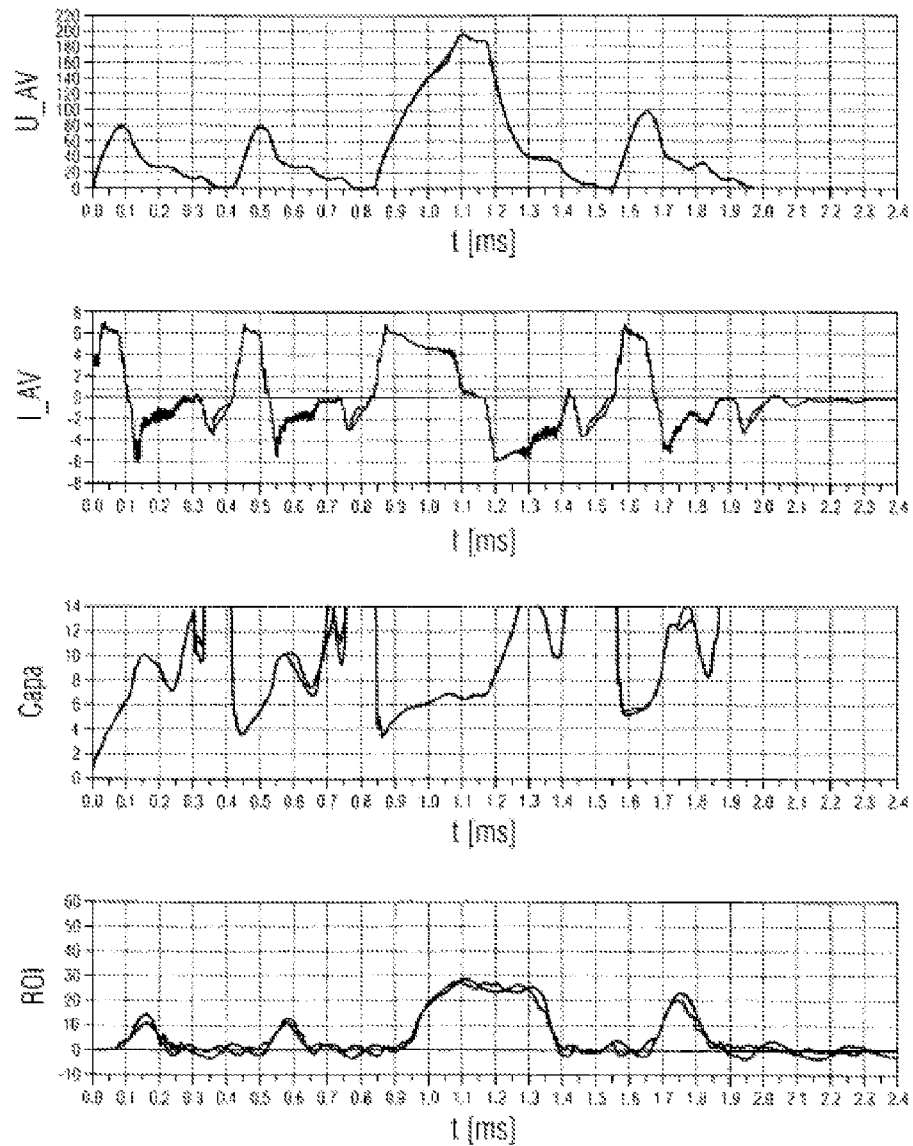
FIG. 3 shows further signal profiles during the operation of the injection valve in the first operating mode.
Figure 4:
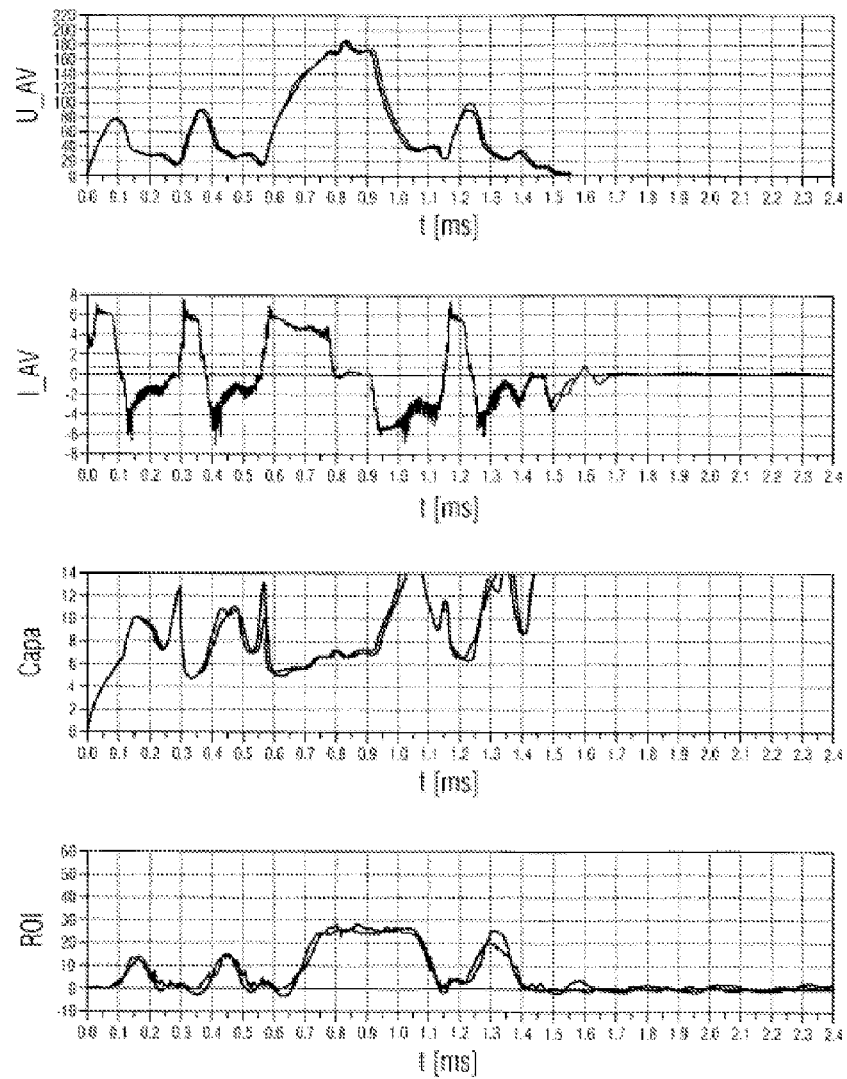
FIG. 4 shows signal profiles during operation of the injection valve in the second operating mode.
Figure 5:
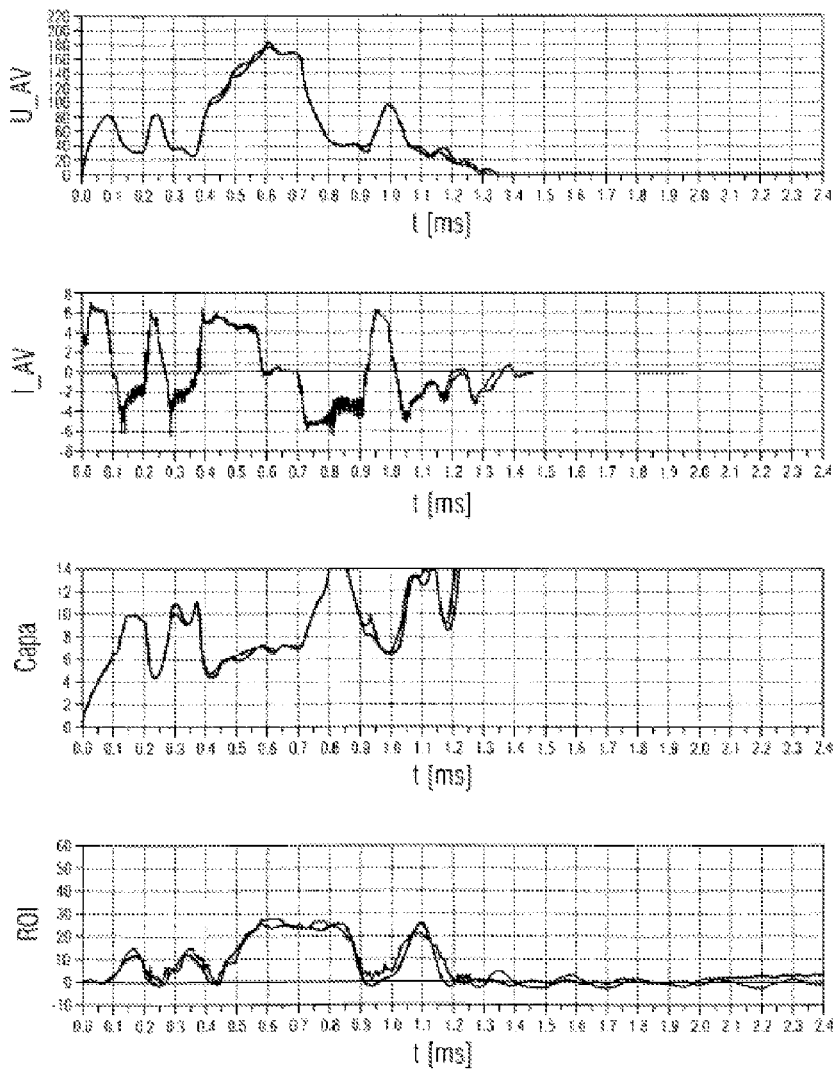
FIG. 5 shows signal profiles during operation of the injection valve in the third operating mode.

FIG. 3 illustrates further exemplary signal profiles of the detected voltage U_AV, of the detected current I_AV, of the detected metering rate ROI and of a detected capacitance Capa of the solid-state actuator 18 in the first operating mode BM1, plotted against the time t. FIG. 4 illustrates corresponding profiles during operation of the injection valve in a second operating mode BM2. FIG. 5 illustrates corresponding profiles, plotted against the time t, during operation of the injection valve in the third operating mode BM3.

By contrast to the first operating mode BM1, in the second operating mode BM2, the first operating phase BP1 and subsequently the second operating phase BP2 are carried out, whereas the third operating phase is omitted. In this way, the minimum possible metering phase between two successive fluid metering events is reduced in relation to the first operating mode BM1. In the second operating mode BM2, no residual charge remains in the solid-state actuator 18. As a result of the residual charge, the electrohydraulic delay time duration T_EH is in particular also shortened.

In the third operating mode BM3, the first operating phase BP1 is carried out, whereas the second and third operating phases BP2, BP3 are omitted. In this way, the minimum metering interval is further reduced. Then, in the third operating mode BM3, the second operating phase BP2 is also omitted, and thus operation of the solid-state actuator as a sensor, with corresponding detection of the arrival of the nozzle needle 12 at its closed position, is dispensed with.

In this connection, it is also possible in the third operating mode, in the first operating phase, for the solid-state actuator to be discharged to an increased partial charge in relation to the second and/or the first operating mode BM2, BM1. This, too, contributes to a further shortening of the electrohydraulic delay time period T_EH.

The different operating modes BM1 to BM3 may be controlled by means of a state machine which is illustrated in FIG. 3 and which may be in the form of a program in the control device 22, said program being stored in a memory of the control device 22 and be executed for example in a corresponding microprocessor of the control device 22 during operation.

A state transition from the first operating mode BM1 to the second operating mode takes place if a condition C1 is met. A transition from the second operating mode to the first operating mode BM1 takes place if a second condition C2 is met. A state transition from the second operating mode BM2 to the third operating mode BM3 takes place if a condition C3 is met. A state transition from the third operating mode to the second operating mode BM2 takes place if a fourth condition C4 is met. A state transition from the first operating mode BM1 directly into the third operating mode takes place if a fifth condition C5 is met. A state transition from the third operating mode BM3 into the first operating mode BM1 takes place if a sixth condition C6 is met. The conditions C1 to C6 are selected such that a switch is made in the next-higher operating mode, that is to say for example from the first operating mode BM1 into the second operating mode BM2, if the desired metering interval demands this. Here, for example, for condition C1 to be fulfilled, it may be necessary for the desired metering interval to be smaller than a predefined first threshold value. For the second condition C2, it may be provided that this is fulfilled as a function of whether the desired metering interval is larger than the first threshold value plus a predefined hysteresis value. The conditions C3 to C6 may thus be configured correspondingly.

Compensation of the charging time duration T_CHA of the solid-state actuator 18 and/or of a regulation of the electrical energy to be supplied to the solid-state actuator 18 and/or of the regulation of the electrical energy to be supplied to the solid-state actuator 18 may then takes place, as a function of the residual charge quantity at the end of the closing process as estimated by means of the charge monitoring means 24, by means of adaptation of a profile of a current setpoint value for the solid-state actuator 18 and/or of the activation duration and/or of the start of activation SOI and/or of a needle flight time and/or of a needle opening duration. In this way, it is possible in particular in the second operating mode BM2 and also in the third operating mode BM3 to attain quantity stability despite a partial charge still being present.

As a result of the omission of the third operating phase BP3, in particular the electrohydraulic delay time duration T_EH is shortened. The metering of fluid multiple times within a working cycle of an internal combustion engine takes place for example by means of one or more pilot injections and a main injection, and if appropriate also one or more post-injections. The compensation functions specified above may also be dependent on one or more operating variables.

What is claimed is:

1. A method for operating an injection valve including a nozzle needle that prevents a metering of fluid when in a closed position and otherwise permits the metering of fluid, a solid-state actuator configured to act on the nozzle needle and influence the position thereof, the method comprises:
    performing a closing process of the nozzle needle in a first operating mode by:
        performing a first operating phase during which the solid-state actuator is discharged to a predefined partial charge,
        performing a second operating phase during which the solid-state actuator is operated as a sensor, the operating duration of which second operating phase is predefined such that the nozzle needle reaches the closed position during the operating duration, and
        performing a third operating phase during which the solid-state actuator is discharged further to a predefined reference state, and
    performing a closing process of the nozzle needle in a second operating mode by:
        performing the first operating phase,
        performing the second operating phase, and
        omitting the third operating phase.

2. The method of claim 1, wherein, for the closing process, in a third operating mode,
    performing the first operating phase,
    omitting the second operating phase, and
    omitting the third operating phase.

3. The method of claim 1, wherein changes between the individual operating modes are carried out as a function of a desired metering interval between successive fluid metering events.

4. The method of claim 1, wherein a residual charge quantity at the end of the closing process is estimated by means of a charge monitoring means.

5. The method of claim 1, wherein a charging time duration of the solid-state actuator in a subsequent opening process is adapted as a function of the estimated residual charge quantity and/or a determined residual voltage.

6. The method of claim 1, wherein a regulation of the electrical energy to be supplied to the solid-state actuator is adapted as a function of the estimated residual charge quantity and/or a determined residual voltage.

7. The method of claim 1, wherein the adaptation of the regulation of the electrical energy to be supplied to the solid-state actuator is carried out by adaptation of a profile of a current setpoint value for the solid-state actuator.

8. The method of claim 1, wherein an activation duration extending from a start of the charging to a start of the discharging of the solid-state actuator is adapted as a function of the estimated residual charge quantity and/or a determined residual voltage.

9. The method of claim 1, wherein a start of activation which represents the start of the charging of the solid-state actuator is adapted as a function of the estimated residual charge quantity and/or a determined residual voltage.

10. The method of claim 1, wherein a needle flight time and/or a needle opening duration are/is adapted as a function of the estimated residual charge quantity and/or a determined residual voltage.

11. A device for operating an injection valve including a nozzle needle that prevents a metering of fluid when in a closed position and otherwise permits the metering of fluid, a solid-state actuator which is designed to act on the nozzle needle and influence the position thereof,
    wherein the device is configured to close the nozzle needle in a first operating mode by:
        performing a first operating phase during which the solid-state actuator is discharged to a predefined partial charge,
        performing a second operating phase during which the solid-state actuator is operated as a sensor, the operating duration of which second operating phase is predefined such that the nozzle needle reaches the closed position during the operating duration, and
        performing a third operating phase during which the solid-state actuator is discharged further to a predefined reference state,
    and wherein the device is further configured to close the nozzle needle in a second operating mode by:
        performing the first operating phase,
        performing the second operating phase and
        omitting the third operating phase.

* * * * *